Patented Feb. 24, 1925.

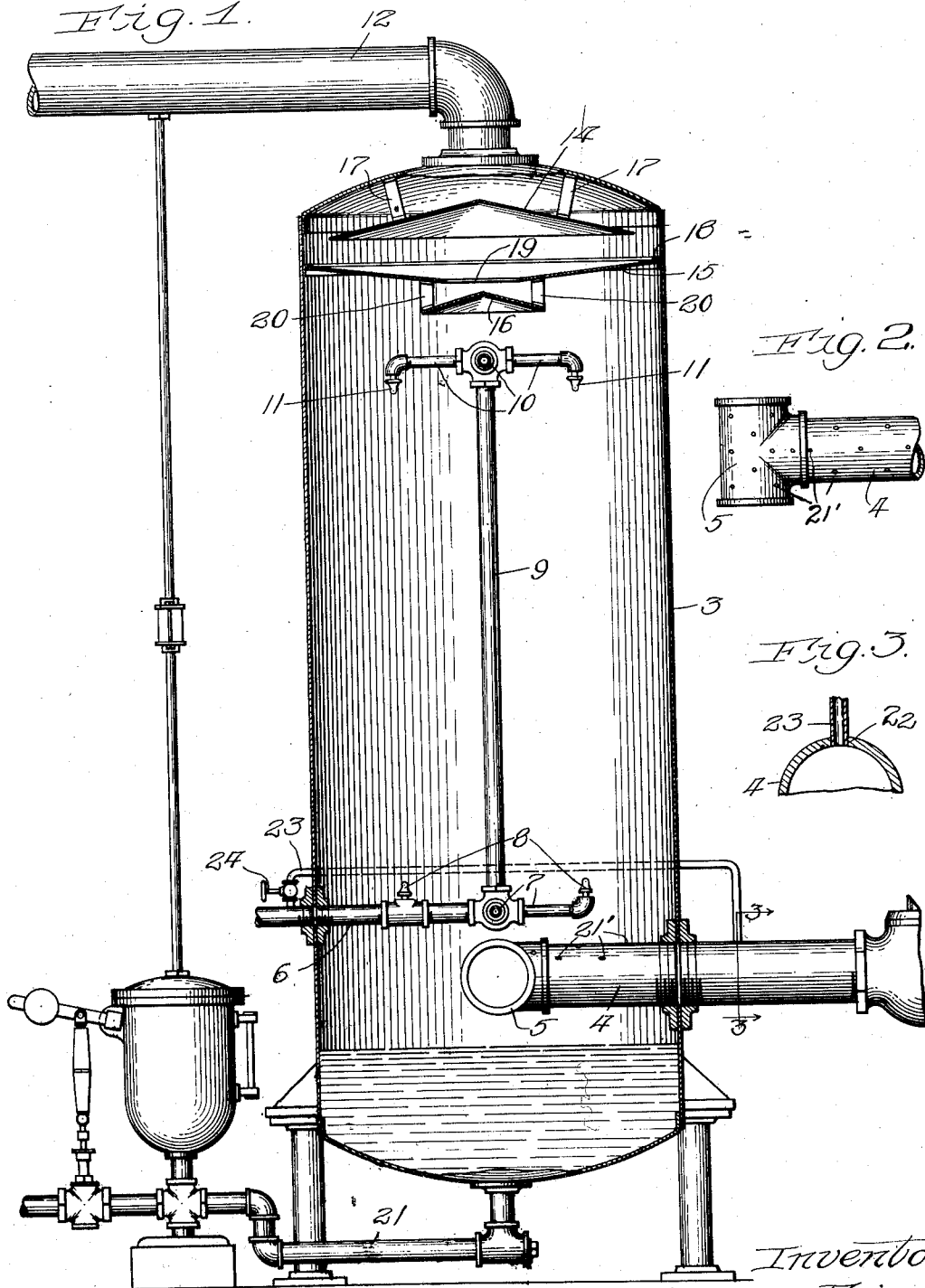

1,527,640

UNITED STATES PATENT OFFICE.

HERMAN FRIEDL, OF CHICAGO, ILLINOIS.

ART OF REFRIGERATING GASEOUS FLUIDS.

Application filed April 7, 1924. Serial No. 704,758.

*To all whom it may concern:*

Be it known that I, HERMAN FRIEDL, a citizen of the United States, residing at Chicago, in the county of Cook and State of Illinois, have invented a new and useful Improvement in the Art of Refrigerating Gaseous Fluids, of which the following is a specification.

My invention relates generally to the refrigerating of gaseous fluids, but more particularly to the refrigerating of air.

As to one phase of the invention it relates to the refrigerating of the gaseous fluid by contacting it with refrigerating brine by which operation particles of salt are sometimes caused to become mixed with the gaseous fluid, which is objectionable, it being my object in this connection to remove such particles of salt.

As to another phase of the invention it relates to the preventing of accumulations of frost in the pipe through which the gaseous fluid, to be refrigerated, is conducted into the space in which it is to be subjected to the refrigerating action.

I have devised my invention for use more particularly in the refrigerating of air, to dehydrate it, supplied to the ice-freezing cans of ice-making apparatus for agitating the water in the cans during the freezing thereof, and more especially to a condition wherein the air before entering the cans is contacted with refrigerated brine to reduce its temperature sufficiently to freeze the moisture out of the air before the air enters the portions of the pipes which are subjected to refrigerating temperature and which, if not removed, would produce clogging of the pipes and have, therefore chosen to illustrate it in such connection.

Referring to the accompanying drawing:

Figure 1 is a view in elevation, with certain parts sectioned, of an apparatus embodying my invention and adapted for the practicing of my improved method. Figure 2 is a broken plan view of that portion of the pipe which extends into the treating tank and through which the gaseous fluid to be treated, is introduced into the tank; and Fig. 3, a broken section taken at the line 3—3 on Fig. 1 and viewed in the direction of the arrow. The apparatus shown comprises a tank 3 through a side of which, near its lower end, a pipe 4, communicating with any suitable source of gaseous fluid to be treated, as for example a supply (not shown) of compressed air, extends. The inner end of this pipe extends at an angle to the vertical, it being shown as extending substantially horizontal, its inner extremity being formed with a T, indicated at 5, the oppositely extending ends of which are open.

Opening into the tank 3 near its bottom and, as shown, through its side-wall and preferably above the pipe 4, is a pipe 6 which opens at its inner end into the tank 3, this pipe being preferably provided with branch pipes 7 shown as 3 in number, two of them being diametrically opposed and the third one arranged at an angle of 90° to each of the others, and diametrically opposed to the pipe 6, each of the branch pipes 7 and the pipe 6 having an upwardly-discharging spray-nozzle 8. The pipe 6 communicates with any suitable source of refrigerated brine, as for example the brine tank of an ice-making apparatus preferably at its lower portion where the brine is the coldest. A pipe 9 leads upwardly, in the tank, from the center of the radiating branch pipes 7 and terminates at its upper end, within the tank, in radially-disposed pipes 10, in the arrangement shown four in number and equidistantly spaced apart, each equipped with a downwardly discharging spray-nozzle 11.

It will be noted that by the arrangement shown refrigerated brine will be sprayed upwardly from the nozzles 8 and downwardly from the nozzles 11.

The tank 3 contains, in its top, an outlet communicating with a pipe 12 through which the air discharged into the tank 3, through the pipe 4 and acted on by the sprayed brine in the tank, discharges, from which it is conducted to the point of use, as for example in the ice-making apparatus referred to, into the water in the cans, the tank 3 containing in its upper portion baffle plates 14, 15 and 16. The baffle plate 14 is of conical form and of less diameter than the internal diameter at the tank 3 it being supported in spaced relation to the top of the tank by brackets 17 depending from the latter. The baffle plate 15 is of inverted frusto-conical shape supported at its marginal edges on the inner side of the tank by a flange ring 18, the plate 15 being disposed in vertically spaced relation to the plate 14 and containing a centrally disposed opening 19. The plate 16 is of relatively small diameter and of conical form, this plate being spaced vertically from, and extending below, the plate 15 and supported by the latter from brackets 20. The various baffle plates referred to form tortuous passages for the air in its travel to the outlet of the tank 3.

In the operation of the apparatus the brine discharged through the nozzles 8 and 11 collects in the bottom of the tank 3 flowing therefrom through the pipe 21 which, by way of example, may lead back to the refrigerating tank from which the brine supplied to the pipe 6, is drawn.

In the use of the apparatus described the air, under pressure, supplied to the pipe 4 discharges therefrom at the open ends of the T thence flowing upwardly where it contacts with the upwardly directed brine-spray, issuing from the nozzles 8, thereby becoming refrigerated and freezing the moisture in the air. The air in rising in the tank 3 is subjected to the downwardly-showering brine issuing from the nozzles 11, the effect of which is to throw down in the tank 3 any solid particles of salt or particles of brine which may have become entrained in the air, by reason of its contact with the brine-spray issuing from the nozzles 8, the air, in refrigerated condition and freed of moisture and solid particles of salt and particles of brine flowing out through pipe 12. The baffles are provided to reduce the possibility of such particles of brine and particles of salt as may have become entrained with air, from being discharged with the air through the pipe 12, in case of clogging or otherwise impairment of the means which produce the downwardly-directed brine-spray.

The spray discharging downwardly from the nozzles 11 forms an obstructing blanket which acts on the solid particles of salt and the particles of brine moved with the air to throw down these particles while permitting the air to pass upwardly therethrough to the pipe 12 it being observed that whereas the brine discharging upwardly from the nozzles 8, and thus against gravity, becomes reduced to very small particles, producing what might be termed a brine-mist within the tank, which insures intimate contact of air with the brine, the brine discharging downwardly from the nozzles 11 does not become so finely divided, and the speed at which it descends, and consequently the force exerted by the descending brine, progressively increases, with the result that the solid particles of salt and particles of brine which may be in the air are forced downwardly into the bottom of the tank.

It has been found in practice, especially where the air is supplied to the pipe 4 under relatively low pressure, that, due to the subjection of this pipe to a freezing temperature, some of the moisture in the air congeals upon the inner surface of the pipe 4 at the portion thereto which extends into the tank 3 and also upon that portion of this pipe which is exterior of the tank 3, but closely adjacent thereto, the accumulations of the frost thus produced often times becoming so thick as to produce objectionable choking of this pipe and impairing the apparatus for properly functioning. To the end that such accumulations may not occur, I provide means for supplying refrigerating fluid to the inner surface of the pipe 4, at the portions referred to, the means shown for this purpose involving the aperturing of the upper surface of the pipe 4 at the portion thereof which extends into the tank 3, as represented at 21', and the aperturing of the outer portion of this pipe at a point exterior of the tank 3, as represented at 22, the aperture 22 being connected with a pipe 23 leading from any suitable source of refrigerating fluid, this pipe, in the construction shown, being connected with the pipe 6 and having a valve 24 for controlling the flow of refrigerating brine to the pipe 4. The pipe 23, by way of example, may be of about ⅛ inch internal diameter and preferably extends to a point not below the internal surface of the pipe at the point where it enters the latter.

The apertures 21' are relatively small and relatively closely grouped, as represented in the drawings, whereby portions of the brine supplied to the tank through the nozzles 8 and 11, enter the openings 21 and flow down the inner surface of the portion of the pipe which extends into the tank 3, the moisture on the inner surface of the pipe 4 causing the refrigerating fluid thus supplied to its interior, to become diffused over the inner surface of the pipe and thus prevent the formation of frost within the pipe. The same action takes place at the portion of the pipe 4 exterior of the tank 3, but closely adjacent thereto, by reason of the supplying of brine of this pipe through the pipe 23.

While I have illustrated and described a particular construction involved in my invention, and have shown and described a particular form of apparatus for use in practicing my improved method, I do not wish to be understood as intending to limit it thereto as the structure shown may be variously modified and altered, and the method practiced with other apparatus, without departing from the spirit of my invention.

What I claim as new and desire to secure by Letters Patent, is:

1. The method of refrigerating gaseous fluid which consists in contacting the fluid with refrigerating brine of a temperature sufficient to reduce the temperature of the fluid materially below 32° and moving in one direction and thereafter contacting the gaseous fluid with fluid moving in another direction to remove solid particles of salt from the gaseous fluid.

2. The method of refrigerating gaseous fluid which consists in contacting the fluid with refrigerating brine of a temperature sufficient to reduce the temperature of the fluid materially below 32° and moving in an upward direction and thereafter contacting the gaseous fluid with fluid moving in a downward direction to remove solid particles of salt from the gaseous fluid.

3. The method of refrigerating gaseous fluid which consists in contacting the fluid with a shower of refrigerating brine of a temperature sufficient to reduce the temperature of the fluid materially below 32° and moving in one direction and thereafter subjecting the gaseous fluid to a shower of fluid moving in another direction to remove solid particles of salt from the gaseous fluid.

4. The method of refrigerating gaseous fluid which consists in contacting the fluid with an upwardly-directed shower of refrigerating brine of a temperature sufficient to reduce the temperature of the fluid materially below 32° and thereafter subjecting the gaseous fluid to a descending shower of fluid to remove solid particles of salt from the gaseous fluid.

5. The method of refrigerating gaseous fluid which consists in contacting the fluid with refrigerating brine of a temperature sufficient to reduce the temperature of the fluid materially below 32° and moving in one direction and thereafter contacting the gaseous fluid with refrigerating fluid moving in another direction to remove solid particles of salt from the gaseous fluid.

6. The method of refrigerating gaseous fluid which consists in contacting the fluid with refrigerating brine of a temperature sufficient to reduce the temperature of the fluid materially below 32° and moving in an upward direction and thereafter contacting the gaseous fluid with refrigerating fluid moving in a downward direction to remove solid particles of salt from the gaseous fluid.

7. The method of refrigerating gaseous fluid which consists in contacting the fluid with a shower of refrigerating brine of a temperature sufficient to reduce the temperature of the fluid materially below 32° and moving in one direction and thereafter subjecting the gaseous fluid to a shower of refrigerating fluid moving in another direction to remove solid particles of salt from the gaseous fluid.

8. The method of refrigerating gaseous fluid which consists in contacting the fluid with an upwardly directed shower of refrigerating brine of a temperature sufficient to reduce the temperature of the fluid materially below 32° and thereafter subjecting the gaseous fluid to a descending shower of refrigerating fluid to remove solid particles of salt from the gaseous fluid.

9. The methof of refrigerating gaseous fluid which consists in contacting the fluid with refrigerating brine of a temperature sufficient to reduce the temperature of the fluid materially below 32° and thereafter subjecting the gaseous fluid to fluid to remove solid particles of salt from the gaseous fluid.

10. The method of refrigerating gaseous fluid which consists in contacting the fluid with refrigerating brine of a temperature sufficient to reduce the temperature of the fluid materially below 32° and thereafter subjecting the gaseous fluid to refrigerating fluid to remove solid particles of salt from the gaseous fluid.

11. In apparatus for refrigerating gaseous fluid to remove particles of salt therefrom, the combination of a tank containing an inlet for gaseous fluid to be refrigerated, means for contacting the gaseous fluid with refrigerating brine of a temperature sufficient to reduce the temperature of the fluid materially below 32°, and fluid-means for removing particles of salt from the gaseous fluid.

12. In apparatus for refrigerating gaseous fluid to remove particles of salt therefrom, the combination of a tank containing an inlet for gaseous fluid to be refrigerated, means for spraying refrigerating brine of a temperature sufficient to reduce the temperature of the fluid materially below 32° in the tank for contacting with the gaseous fluid, and means for spraying fluid into the gaseous fluid after it is contacted with the brine-spray.

13. In apparatus for refrigerating gaseous fluid to remove particles of salt therefrom, the combination of a tank containing an inlet for gaseous fluid to be refrigerated, means for spraying refrigerating brine of a temperature sufficient to reduce the temperature of the fluid materially below 32° in the tank in an upward direction for contacting with the gaseous fluid, and means for spraying fluid downwardly into the gaseous fluid after it is subjected to the upwardly-directed spray of brine.

14. In apparatus for refrigerating gaseous fluid to remove particles of salt therefrom, the combination of a tank containing an inlet for gaseous fluid to be refrigerated, and an outlet above said inlet, means for forcing the gaseous fluid into said tank through said inlet, spraying devices arranged one above the other in spaced relation in said tank, the upper one of said devices being above said inlet, and means for supplying refrigerating brine of a temperature sufficient to reduce the temperature of the fluid materially below 32° to said devices, the lower one of said devices being arranged to spray the brine upwardly and the upper one of said devices being arranged to spray the brine downwardly against the rising gaseous fluid after the latter has been subjected to the refrigerating action of the brine discharging from the lower one of said devices.

15. In apparatus of the character set forth the combination of a tank, an air-pipe extending into said tank and opening into the latter, means for refrigerating the air in said tank supplied thereto through said pipe, and means whereby refrigerating liquid enters said pipe and flows upon its inner wall-surface.

16. In apparatus of the character set forth, the combination of a tank, an air-pipe extending into said tank and opening into the latter, and means for causing refrigerating liquid in finely divided condition to contact with the air in said tank supplied thereto through said pipe, the upper wall of said pipe being apertured to permit the refrigerating liquid to enter said pipe and flow upon its inner wall-surface.

17. In apparatus of the character set forth, the combination of a tank, an air-pipe extending into said tank and opening into the latter, and means for causing refrigerating liquid in finely divided condition to contact with the air in said tank supplied thereto through said pipe, the upper wall of said pipe containing a plurality of apertures to permit the refrigerating liquid to enter said pipe and flow upon its inner wall-surface.

18. In apparatus of the character set forth, the combination of a tank, an air-pipe opening into said tank, means for refrigerating the air in said tank, and means for introducing refrigerating liquid into the upper portion of the wall of said pipe at a point exterior of said tank, but closely adjacent thereto for flowing against the side-wall-portions of said pipe, for the purpose set forth.

19. In apparatus of the character set forth, the combination of a tank, an air-pipe opening into said tank, means for refrigerating the air in said tank, the upper portion of the wall of said pipe containing an opening, a pipe communicating with said opening and extending short of a point below the wall of said pipe immediately adjacent said opening for supplying refrigerating liquid to said pipe through said opening.

HERMAN FRIEDL.